United States Patent [19]

Yamada et al.

[11] 4,169,661

[45] Oct. 2, 1979

[54] THERMAL-OPTICAL CONVERTER

[75] Inventors: Tsutomu Yamada, Higashimurayama; Jun Maeno, Sekimachi, both of Japan

[73] Assignee: Hideki Ishii, Tokyo, Japan

[21] Appl. No.: 791,526

[22] Filed: Apr. 27, 1977

[30] Foreign Application Priority Data

May 4, 1976 [JP] Japan ................................ 51-049856

[51] Int. Cl.² ............................................ G01D 15/34
[52] U.S. Cl. ..................................... 350/353; 350/354
[58] Field of Search ................................. 350/353, 354

[56] References Cited

U.S. PATENT DOCUMENTS 3,266,370 8/1966 Marks et al. ......................... 350/353

Primary Examiner—William L. Sikes
Attorney, Agent, or Firm—Finnegan, Henderson, Farabow & Garrett

[57] ABSTRACT

A thermal-optical converter which comprises an aqueous solution containing a non-ionic compound with a functional group, a closed vessel for containing the solution and a transparent window fitted to at least one part of the closed vessel which allows the solution to be visible. Because the aqueous solution is transparent at low temperatures and opaque at elevated temperatures, the thermal-optical converter can effect reversible optical changes in accordance with changes in the temperature of the solution.

26 Claims, 9 Drawing Figures

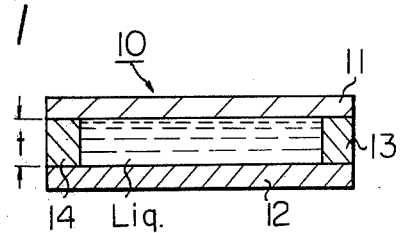
Fig. 1
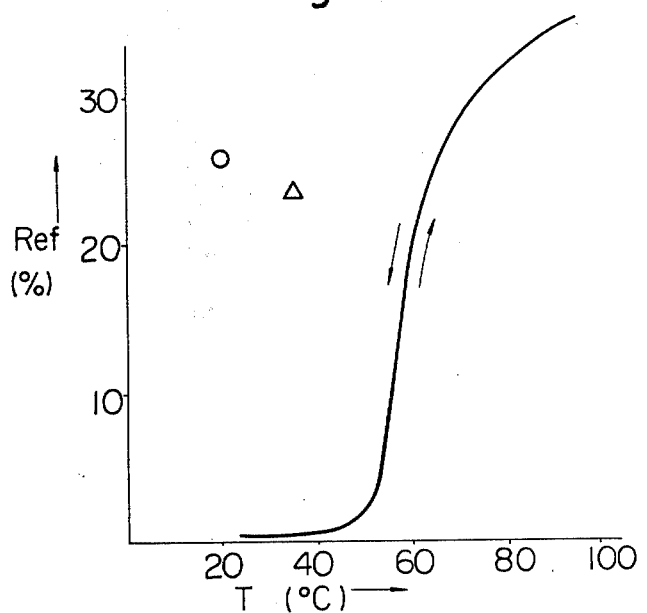
Fig. 2
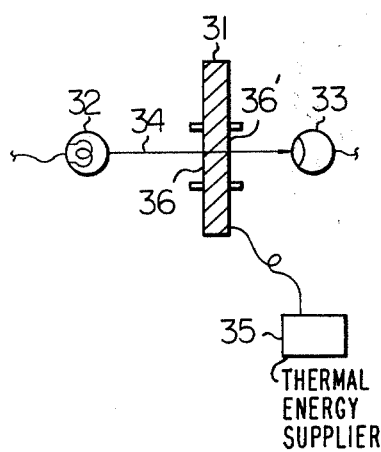
Fig. 3 (I)
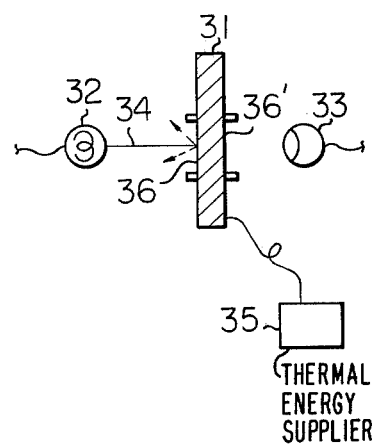
Fig. 3 (II)

Fig. 4 (II)

THERMAL-OPTICAL CONVERTER

BACKGROUND OF THE INVENTION

1. Field of the Invention

This invention relates to thermal-optical converters which change optically due to a sensitive response to heat. 2. Description of the Prior Art As materials which change optically (visually) due to their sensitive response to heat, several heat-sensitive materials have already been proposed and provided for practical uses. One of these materials is a uniform dispersion of a finely divided, colorless leuco dyestuff (opaque) and a phenolic compound in an aqueous solution of polyvinyl alcohol, which dispersion is being used as a heat-sensitive paper for a thermal printer. Another one of these materials is composed of a cholesteric organic compound or $K_2Cu(SO_4)_2$ and the like which can develop a color by releasing water from crystals. The two heat-sensitive materials mentioned above have been widely used in respective applicable fields. However, both materials have advantages and disadvantages, which cause them to be insufficient as materials for satisfying the following functions or properties.

(a) The reversible optical conversions of the materials must depend on the presence or absence of heat.

(b) One phase of the two optical conversion phases which are dependent on the presence or absence of heat must be a "transparent" phase.

(c) The structure or composition of the enclosures containing the materials must be simple and stable over a long period of time, and such structure can be realized in forms varying from small to extra-large sizes.

(d) The materials must not cause environmental pollution.

(e) The converters must be inexpensively produced.

SUMMARY OF THE INVENTION

It is an object of the present invention to provide a thermal-optical converter which can satisfy the requirements of the above items of (a) through (e) and which can cause efficient thermal-optical conversions.

It has been found according to the invention that on dissolving or swelling a specified substance in transparent water to form an aqueous solution in a closed vessel, the substance is aggregated or dispersed due to the characteristic of the substance wherein the interaction between molecules of the substance becomes higher or lower than the affinity with water molecules depending on the temperature of the aqueous solution. Accordingly, two states, i.e., the "opaque" and the "transparent" states of the above-mentioned aqueous solution, can be perceived through a transparent window which is provided in at least one part of the closed vessel, when the aqueous solution of the specified substance dissolved or swollen therein to form a thermal-optical converter is directly or indirectly heated or cooled from the inside or outside to aggregate or disperse the above substance.

BRIEF DESCRIPTION OF THE DRAWINGS

FIG. 1 shows a cross-sectional view of a converter according to the invention;

FIG. 2 is a graph showing the relationship between temperatures (T) and reflectances (Ref) determined by measurements of the converter illustrated in FIG. 1;

FIGS. 3(I) and 3(II) are schematic drawings showing the "on" and "off" states of a light-screening switch, respectively, according to the invention;

FIGS. 4(I) and 4(II) are schematic drawings showing the "on" and "off" states of a reflective-switch, respectively, according to the invention;

DETAILED DESCRIPTION OF THE INVENTION

Figure 4:
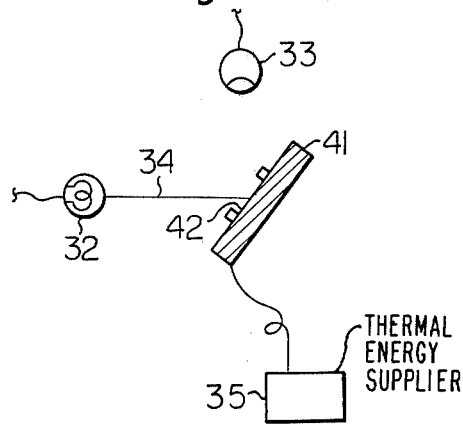

The heat-sensitive material in the thermal-optical converter according to the invention is an aqueous solution containing a specified substance dissolved or swollen therein. This specified substance has the characteristics of being aggregable and dispersible in the aqueous solution depending on the fluctuations of the temperature of the aqueous solution. During aggregation of the specified substance, the aqueous solution becomes opaque, whereas during dispersion, such solution becomes transparent. The present invention proposes a non-ionic compound having a functional group as the specified substance which exhibits a clouding phenomenon while changing the appearance of the substance from transparent to opaque and which does not cause environmental pollution. Examples of such type of substances which are employed in the present invention are shown below:

Polyoxyethylene nonyl-phenol ether,
Polyoxyethylene-hardened castor oil,
Polyoxyethylene-coconut amide,
Ethylene oxide-propylene oxide copolymer,
Alkyl ester of ethylene oxide-propylene oxide copolymer,
Ethylene oxide-1-phenoxy-2,3-epoxypropane copolymer,
Ethylene oxide-N-(2,3-epoxypropyl)-N-phenyl-methyl amine copolymer,
Esteric adduct of styrene-maleinic acid copolymer with polyoxyalkyl ether,
Hydroxypropyl-polyvinyl alcohol,
Hydroxypropyl cellulose,
Hydroxypropyl amylose,
Hydroxypropyl amylopectin,
Hydroxypropyl pullulan,
Hydroxypropyl cyclodextrin,
Aminopropyl cellulose,
Ethyleneimine-1,1-dimethyl-ethyleneimine copolymer,
Ethyleneimine-1-fenethylethylenimine copolymer,
β-oxypropionyl nonyl-phenol ester,
Cellulose β-hydroxybutanoate,
Methyl cellulose,
Ethyl cellulose.

The functional group of the above-mentioned specified substances, that is, a non-ionic compound, is, for example, of the following formula:

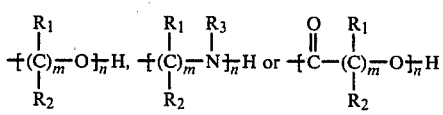

in which m is an integer of 2 or more; n is an integer of 1 or more; and each of $R_1$, $R_2$ and $R_3$ is hydrogen, lower alkyl, hydroxyalkyl, halogenoalkyl, phenyl, phenylalkyl, phenoxyalkyl amine, aminoalkyl, iminoalkyl or the like, and may be in the form of ethers, imines or esters.

The monomers for forming the above groupings include ethers such as ethylene or propylene oxide, 1-chloro-2,3-epoxy-propane, 1-hydroxy-2,3-epoxypropane, 1-phenoxy-2,3-epoxypropane or 2,2-dimethyl-1,3-epoxypropane; imines such as ethyleneimine, propyleneimine, butyleneimine or 1,1-dimethylethyleneimine, 1-n-butylethylenimine, 1-fenethylethylenimine; esters such as β-propiolactone or β-butyrolactone.

The parent compounds, to which these functional groups are chemically bonded, may be of any type. On the other hand, a polymer of the functional group itself is also a non-ionic compound used in the present invention. The polymer is not necessarily a homopolymer of the group.

The parent compounds are, for example, nonyl phenol, phenyl-stearic acid, benzyl-cresol, hydroxystearic acid, fatty acid ester of coconut oil and Turkey red oil, rosin ester, coconut amide and amine, polysaccharides such as cellulose, dextran, dextrin, cyclodextrin, pullulan, amylose, amylopectin, mannan, xylan, alginic acid, polyvinyl alcohol, polyvinyl amine, polyacrylic acid, styrene-maleinic acid copolymer and the like. These compounds are bonded to the functional groups described above to form derivatives thereof. These derivatives must be soluble in water, and they must be completely aggregated to opacify at high temperatures.

Water which dissolves or swells the non-ionic compounds having the functional groups described above is not especially restricted to pure water such as distilled water. However, the water used for such purposes may be ordinary water. The concentration of the compounds in the aqueous solution is not critical and should preferably range from 0.1 to 80 wt.%. The concentration of the solution should be decided by the molecular weight and viscosity of the specified compound and by the purpose of use.

The solution may contain additives which can vary the temperature ranges in accordance with the degree of aggregation (opaqueness) or dispersion transparency of the specified compound. Electrolytes and low molecular organic compounds may be used as additives for lowering the temperature of the solution. The electrolytes which can be used for such purposes are inorganic, organic and high molecular compounds, and, preferably, neutral inorganic electrolytes such as NaCl, KCl, $Na_2SO_4$ and the like with respect to the stability of the solution. The organic compounds used include, for example, toluene, cyclohexane, butyl acetate, etc. The compounds suitable for elevating the temperature range may be, for example, cetane, dodecane, decane, etc. The concentration of each of these additives ranged from $1 \times 10^{-5}$ to 30 wt.% according to the purpose.

As the aqueous solutions used according to the invention have already been explained hereinbefore, the characteristics appearing after heating of such solutions are now described in detail. Since such solutions are transparent at low temperatures (normal temperatures), and opaque (turbid) at elevated temperatures, the thermal-optical converter of the invention can thereby be obtained. The temperatures, at which the aqueous solutions begin to become turbid and opaque, vary according to the kind of compounds and the amount of additives employed, both of which can be selectively predetermined.

In general, the greater the difference is in the optical (visual) conversions caused by fluctuations in the temperature, that is, as the contrast between "transparency" and "opaqueness (whiteness)" becomes more striking, the more suitable the thermal-optical converter will become.

Accordingly, the inventors have carried out the following experiment in which such contrasts have been proven. FIG. 1 shows a cross-sectional view of the converter used in this experiment. As shown in FIG. 1, the converter consists of an upper substrate 11, a lower substrate 12, and spacers 13 and 14 interposed between both substrates. These substrates (11, 12) and the spacers (13, 14) form a vessel 10. The aqueous solution Liq is enclosed in the vessel 10. For convenience of the experiment, the lower substrate 12 is entirely composed of a black glass plate, and the upper substrate 11 is composed of a transparent glass plate 1.2 mm thick. The thickness of each of the spacers (13, 14) is 0.68 mm. When the converter is at normal temperatures (20° to 40° C.), the aqueous solution Liq is transparent and black (color of the lower substrate) when seen from the upper substrate 11. When the entire converter is heated, the aqueous solution Liq turns to a white color. In order to estimate the degree of whiteness of the solution as an absolute value, a commercially available reflectometer (not shown) is set on the upper substrate 11 and reflectances thereof are determined.

The graph in FIG. 2 shows results obtained from a 20 wt.% aqueous solution of hydroxypropyl cellulose (viscosity of 2 wt.% aqueous solution is 5 centipoise at 20° C. or the proportion of propylene oxide groups in the molecular weight is about 60% thereof) according to the method described above. The numbers on the abscissa indicate the temperatures (T) of the aqueous solution, and the numbers on the ordinate indicate the reflectances (Ref) (%). An S-curve obtained by connecting the plotted X mark shows the progress of the thermal-optical conversion of the aqueous solution. From the graph, it can be seen that the reflectance (degree of whiteness) Ref of the aqueous solution is practically 0% at about 20° to 40° C. and is increased to about 35% at about 60° to 90° C. The value of the reflectance of 35% represents a visually pure white condition. Therefore, the contrast between the degree of transparency at relatively high temperatures and the degree of opaqueness (whiteness) of the solution at normal temperatures is very striking. In order to determine the degree of opaqueness (whiteness) at a glance from the graph in FIG. 2, the reflectance Ref in the case of 35% by weight dispersion of white fine powder of $CaCO_3$ is plotted on the graph with a reference mark O, and the reflectance Ref in the case of a commercially available milk is plotted on the graph as a reference mark Δ.

Table 1 shows the respective reflectances determined for the following aqueous solutions (A through L) at temperatures ranging from $-10°$ C. to 100° C., according to the present invention.

| Solutions tested in Table 1 | part(s) by weight |
|---|---|
| A. Hydroxypropyl cellulose (specified above) | 1 |

|   | | | |
|---|---|---|---|
|   | | Water | 4 |
| B. | | Hydroxypropyl cellulose (specified above) | 1 |
|   | | 2% aqueous sodium chloride solution | 4 |
| C. | | Hydroxypropyl cellulose (specified above) | 1 |
|   | | 5% aqueous sodium chloride solution | 4 |
| D. | | Hydroxypropyl cellulose (specified above) | 1 |
|   | | 10% aqueous sodium chloride solution | 4 |
| E. | | Hydroxypropyl cellulose (specified above) | 1 |
|   | | 15% aqueous sodium chloride solution | 4 |
| F. | | Hydroxypropyl cellulose (specified above) | 8 |
|   | | Water | 3 |
| G. | | Hydroxypropyl cellulose (specified above) | 8 |
|   | | 1% aqueous sodium chloride solution | 3 |
| H. | | Hydroxypropyl cellulose (specified above) | 8 |
|   | | 5% aqueous sodium chloride solution | 3 |
| I. | | Ethylene oxide-propylene oxide copolymer with mean molecular weight of 3,330 and ethylene oxide content of 40% by weight | 1 |
|   | | Water | 4 |
| J. | | Copolymer as described in I | 1 |
|   | | 10% aqueous sodium chloride solution | 4 |
| K. | | Adduct of hardened castor oil with ethylene oxide with an ethylene oxide number of 60 | 5 |
|   | | 20% aqueous sodium chloride solution | 3 |
| L. | | Adduct of cetyl ethyl oxide having an ethylene oxide number of 10 to styrene-maleinic acid (1:1)-copolymer with a mean molecular weight of 15,000 | 1 |
|   | | Water | 4 |

Table 1
Relationship between temperature and reflectance variation

| Temperature (°C) | A | B | C | D | E | F | G | H | I | J | K | L |
|---|---|---|---|---|---|---|---|---|---|---|---|---|
| −10 |  |  |  |  | 0.48 |  |  |  |  |  |  |  |
| −5 |  |  |  |  | 0.78 |  |  |  |  |  |  |  |
| 0 |  |  |  | 0.23 | 2.60 |  |  |  |  |  |  |  |
| 5 |  |  |  | 0.23 | 10 | p | p | p |  |  |  |  |
| 10 |  |  | 0.23 | 0.50 | 17 | ib | ib | ib |  |  |  | 2.2 |
| 15 |  |  | 0.23 | 0.89 | 23 | b | b | b |  |  |  | 2.2 |
| 20 |  | 0.23 | 0.52 | 3.20 | 27 | g | g | g |  |  |  | 4.0 |
| 25 |  | 0.23 | 0.87 | 9.20 | 30 | y | y | g |  |  |  | 8.3 |
|  |  |  |  |  |  |  |  | w |  |  |  |  |
| 30 | 0.23 | 0.45 | 2.10 | 19 | 32 | o | o | 12 |  | 0.23 |  | 14 |
| 35 | 0.23 | 0.83 | 8.30 | 24 | 34 | r | r | 21 |  | 0.23 |  | 20 |
| 40 | 0.55 | 2.00 | 19 | 29 | 35 | 0.81 | r | 33 |  | 0.42 |  | 24 |
|  |  |  |  |  |  |  | w |  |  |  |  |  |
| 45 | 0.85 | 7.00 | 24 | 31 | 35 | 2.50 | 16 | 35 |  | 0.73 | 0.23 | 27 |
| 50 | 2.20 | 18 | 27 | 33 |  | 3.10 | 24 | 35 |  | 3.10 | 0.23 | 27 |
| 55 | 8.00 | 24 | 30 | 34 |  | 4.00 | 32 |  | 0.23 | 6.30 | 0.43 |  |
| 60 | 19 | 28 | 32 | 35 |  | 5.50 | 35 |  | 0.23 | 12 | 0.92 |  |
| 65 | 25 | 31 | 34 | 35 |  | 8.00 | 35 |  | 0.38 | 15 | 2.70 |  |
| 70 | 28 | 32 | 35 |  |  | 11.5 |  |  | 0.71 | 17 | 5.20 |  |
| 75 | 30 | 34 | 35 |  |  | 12 |  |  | 2.80 | 24 | 11 |  |
| 80 | 32 | 35 |  |  |  | 12 |  |  | 5.70 | 27 | 15 |  |
| 85 | 34 | 35 |  |  |  |  |  |  | 11 | 30 | 17 |  |
| 90 | 35 |  |  |  |  |  |  |  | 14 | 31 | 20 |  |
| 95 | 35 |  |  |  |  |  |  |  | 16 | 31 | 23 |  |
| 100 |  |  |  |  |  |  |  |  | 23 |  | 25 |  |

(Note)
p : purple
g : green
r : red
ib : indigo blue
y : yellow
w : white
b : blue
o : orange The following is an explanation of Table 1. It is understood that the opacifying temperature is optionally controlled only by varying the amount of added sodium chloride. Further, there can be utilized cholesteric liquid crystals of lyotropic-type of polysaccharides according to may pending U.S. Ser. No. 765,592, filed on Feb. 4, 1977 in the name of co-inventor Jun Maeno and assigned to the same assignee as the present invention. F, G and H employ the aqueous solutions of 50% by weight or more of polysaccharides with a mean polymerization degree of from several to 1,000 and functional groups of ether-, imine- or ester-type. By adding sodium chloride, the temperature range is shifted, and the degree of the opaqueness and the coloring strength are increased.

As seen in Table 1, a novel color element can be obtained from adding sodium chloride to aqueous solution in accordance with variations of the temperature, wherein the color of the novel color element is changed from: black→purple→indigo blue→blue→green→yellow→orange→red to white. The above-mentioned process cannot be obtained by using a lyotropic-type of cholesteric liquid crystals of a polysaccharide in an organic solvent. On the other hand, L is an aqueous solution which becomes sufficiently opaque at a relatively low temperature without the addition of sodium chloride.

Further, the functionality and the range of uses of the thermal-optical converter can be increased by imparting a color tone to the aqueous solution. Namely, a coloring matter (dyestuff) with high solubility in water and with a high degree of fastness is added to the aqueous solution. The aqueous solution having a certain color tone at normal temperatures becomes an aqueous solution with a pale tone when combined with a white color at elevated temperatures. Suitable dyestuffs which can be added to aqueous solutions include substantive, acid and basic dyestuffs, etc. The amount of added dyestuffs ranges from 0.01 to 1% by weight. The aqueous solution of the specified compound may be superposed on a solution colored with a coloring matter, such as dispersed dye, which coloring matter being practically immiscible with water and soluble in organic solvents having higher boiling points than water, so that the transparent colored element can be altered to an opaque colored element when the temperature is changed from normal temperatures to elevated temperatures. If desired, a preservative treatment and an ultraviolet screening can be effected thereto.

The composition and properties of the specified compounds according to the invention as well as those of other suitable additives and the like have been stated hereinabove. Several embodiments of the thermal-optical converters having basic compositions are described below. The thermal-optical converter consists fundamentally of (a) an aqueous solution containing the specified compounds, (b) a closed vessel enclosing the aqueous solution and (c) a transparent window fitted to at least one part of the closed vessel.

The closed vessel is formed from glass, ceramics, metals, plastics or other materials which cannot be dissolved or degenerated by the aqueous solution. The transparent window can be made of glass, plastics or similar materials. The method of filling the closed vessel with the aqueous solution is not especially restricted as long as the specified compound and other additives can be contained in an adequate concentration.

According to the invention, transmittance and non-transmittance or reflectance or non-reflectance of the aqueous solution caused by thermal changes can be perceived through the transparent window. The converters of the invention have considerably wide applications. Such applications can be roughly classified into the following four categories of applications:

(1) application as a temperature indicating device;
 (2) application as a screening device;
 (3) application as a switching device, and;
 (4) application as a displaying device.

In particular, the applications of (1) and (2) do not need to have controllable heat supplied thereto from the outside, whereas those of (3) and (4) do need to have controllable heat supplied to the closed vessel containing the aqueous solution (referred to as "enclosure" hereinafter) from the outside. As for application (1), the converters are applicable, for example, as indicators for indicating the temperature of liquid or the like in cups or pots. Namely, when the temperatures of the liquid and the like exceed the clouding temperature of the converter, the vessel is then changed to an opaque color. As for (2), the converters are applicable for example, as sunlight-screening windows or roofs which are also useful as curtains, since the temperature of the enclosure is elevated by the direct sun and the aqueous solution therein becomes opaque. As for (3), if the enclosure is placed in the passage of a light such as laser and the temperature of the enclosure is increased or decreased, a switch screening or passing of the light is obtained. As for (4), a certain pattern can be created by utilizing the transparent and the opaque states of the aqueous solution. For creating a fine pattern, minute enclosures or thermal elements are set in the form of a matrix and points of intersection of the matrix are selectively heated or cooled. Alternatively, the thermal elements per se can be utilized in any predetermined arrangements. Elevating or lowering of the temperature of the aqueous solution is required in each case of applications (1) through (4). However, because only a small amount of the aqueous solution is contained in the enclosure, only a small quantity of heat is needed, and any increase in volume of the aqueous solution by thermal expansion is disregarded. In applications (2) and (4), although the enclosure itself is of a large structure, because of the simplicity of this large structure it is not difficult to manufacture such large enclosures.

As an example of the application (3), a further illustration of the above-described light-switching device (transmittable or reflectible) is presented in connection with FIGS. 3(I) and 3(II) as well as FIGS. 4(I) and 4(II). In these Figures, numerals 31 and 41 indicate the enclosure, 32 a luminous part, 33 a light receiving part, 34 a path of light and 35 a thermal energy supplier. The enclosure 31 has transparent windows 36 and 36' arranged coaxially to the passage of light 34, and the enclosure 41 has a transparent window 42 arranged in the passage 34. The enclosure 31 shown in FIGS. 3(I) and 3(II) is a switch which can allow the light beam to pass through or which can also cut off the light beam. The aqueous solution in the enclosure is transparent at low temperatures. Accordingly, light passes from the luminous part 32 through the transparent windows 36 and 36' to the light receiving part 33 (see FIG. 3(I)). When the enclosure 31 is heated by means of the thermal energy supplier 35, the aqueous solution becomes opaque; therefore, light cannot reach the light receiving part 33 (see FIG. 3(II)). The enclosure 41 shown in FIGS. 4(I) and 4(II) functions as a switch of the reflective type. As a result, the aqueous solution in the enclosure is transparent, and the light transmitted by the transparent window 42 from the luminous part 32, is absorbed by black bodies on the internal surface of the enclosure 41. When the enclosure 41 is heated by operating the thermal energy supplier 35, the aqueous solution then becomes opaque (white), thereby light can be reflected by such solution. Accordingly, the light receiving part 33 receives the reflected light.

The switch of the light screening type shown in FIGS. 3(I) and 3(II) provides another unique function. Thus, a novel effective fire alarm can be provided by arranging a lamp in place of the luminous part 32, a phototransistor in place of the light receiving part 33, and a buzzer or the like operated by the phototransistor in place of the thermal energy supplier 35. As is well known, a fire can be detected by detecting either the flame and/or the smoke thereof. However, no fire alarm has yet been invented which can simultaneously detect both flame and smoke. On the contrary, by using the switch of the light screening type according to the invention, flame can be detected by employing the aqueous solution which can be opacified by temperature increases within the enclosure 31. However, in the case with smoke wherein the temperature of the enclosure is not so markedly elevated, smoke from the fire can be detected by using the aqueous solution which has remained transparent. On the other hand, the principle of the reflective type of switch shown in FIGS. 4(I) and 4(II) can be applied to means other than the fire alarm for achieving a similar object.

The following is a more concrete explanation of the displaying device described in the above-mentioned (4). Desired image patterns are formed on both the upper and the lower substrates constituting the enclosure of the invention. If the enclosure is heated, the inner aqueous solution is opacified. The image pattern on the lower substrate will then disappear, and the image pattern will then become visible on the upper substrate. Alternatively, a desired image pattern can be formed on the upper substrate with the same color as that of the lower substrate. In this case, if the aqueous solution is colorless and transparent, the pattern will be invisible. However, once the inner aqueous solution is opacified by heat, the image pattern will then become clearly visible on the upper substrate. Any color can be applied to the image pattern, but a relatively dark color is most preferred. Furthermore, the same color does not have to be used, and colors and patterns can be selected according to the specific purpose of use.

A matrix pattern (lattice pattern) is formed and connected with a selective circuit, in order to provide an indicating device for various purposes (for example, as guide mark, advertising plate, time indicating plate and the like). As this indicating device is characterized by utilizing the principle regarding the reflection of light, this device is more effective under direct sun during the daytime. Well-known self-luminous indicating devices, such as tube lamp, luminous diode, plasma, fluorescent substance, are not effective under direct sun. Moreover, a liquid crystal used in well-known indicating devices of the reflective type exhibits disadvantages, wherein the crystal lacks color contrasts such as those between black and white colors, and wherein the crystal is unstable when exposed to ultraviolet-light, heat, oxygen, water, and the like. Furthermore, it is very difficult to produce a liquid crystal for use in a very large device. On the other hand, the enclosure of the invention is particularly suitable for use in an extra-large device or for an outdoor application. The enclosure of the invention can be utilized to form a switching device and a display device. In the construction of such devices, any heating means can be connected to the enclosure. The following Items (1) through (8) are descriptions of the heating means.

(1) The opaque part of the enclosure is coated with an exothermic resin coating. Current is subsequently applied to the enclosure. In such a case, the resulting display devices are preferably used to produce large-sized advertising plates or display plates because the applied region coating can uniformly heat a larger surface area of the enclosure. The exothermic resin coatings used herein include, for example, "Plaheat" commercially available from Misato Co., Ltd.; "Achilles Plost," commercially available from Kokoku Chemical Industries, Ltd., and the like.

(2) If the light-transmittable transparent part of the enclosure has a large surface area, then such transparent part should be coated with an exothermic material. For this case, it is necessary that the exothermic material should be both transparent and exothermic. Also, it is preferable to use the conductive transparent coating (the so-called "NESA" coating) of the metal oxides, such as $SnO_2$, $In_2O_3$ and the like, as the exothermic material.

(3) It is preferable that the exothermic part of the enclosure should not be a film or a layer. It may be formed from a Nichrome wire or an iron-chromium wire. In particular, it is desired that the exothermic part superposed on said transparent part be formed from small-gauge wires.

(4) N-type and P-type semiconductors are connected with a metal to form a thermal device which will produce peltier effects. For such a case, if the direction of the applied current is changed from positive to negative, the heating and the cooling of the enclosure can be effected within a short time. In addition, a plurality of the enclosures can be combined together to form a matrix and to produce a display device because the heating part and the cooling part may be separately provided in the enclosure. A converter can be constructed from many blocks of said enclosures by placing said one enclosure in one block. On the other hand, a thermopanel commercially available from Komatsu Electronics Co., Ltd. can be utilized to heat or cool a large surface area.

(5) Barium titanate-type semiconductor ceramic or the so-called "PTC" may be included in the enclosure to prevent the overheating of the heating means because the electric resistance of the PTC can be suddenly increased after the temperature of the PTC has reached Curie point or above. A solid solution of $Sr^{2+}$, $Zr^{4+}$, $Sn^{4+}$, etc., in barium titanate can function as a temperature limiter, within the range of 30° C. to 100° C. The "PTC" can be effectively applied to a large-sized device. On the contrary, this "PTC" itself can be utilized as an exothermic material.

(6) It is also possible to use heating pipes as a heating means.

(7) If desired, a non-contact system such as IR heaters, far IR heaters, $CO_2$-lasers, high-frequency heaters, electron or ion beams, hot air, and the like may be used as the heating means.

(8) It is possible to directly heat an aqueous solution. In this case, the solution is used as a path for the applied current. Commercial alternating electric sources are suitable for heating the solution because, if a direct current is applied to the solution, the direct current will electrolyze the solution.

Table 2 shows results of an experiment according to this direct heating.

Table 2

| Aqueous Solution | Threshold Voltage (V) of Opacifying at the Following Distance Between the Electrodes | | |
|---|---|---|---|
| | 1mm | 5mm | 10mm |
| a | 63 | 98 | 118 |
| b | 36 | 54 | 65 |
| c | 18 | 36 | 46 |
| d | 10 | 23 | 29 |
| e | 8 | 17 | 22 |
| f | 7 | 15 | 19 |
| g | 5 | 10 | 13 |

The aqueous solutions a through g are mixtures of 1 part by weight of hydroxypropyl cellulose described above and 4 parts by weight of an aqueous solution of sodium chloride. The concentrations of the aqueous sodium chloride solutions used in the solutions a through g are 0.01 wt.%, 0.1 wt.%, 0.5 wt.%, 1.0 wt.%, 2.0 wt.%, 3.0 wt.% and 5.0 wt.%, respectively.

As understood from the above Table, the threshold voltage of opacifying is considerably varied by the concentration of salt and the distance between the electrodes. It is desired from the viewpoint of maintaining the stability of the aqueous solution and of maintaining energy consumption tht the voltage necessary for effecting opaque state be lower than the threshold voltage.

Figure 5:
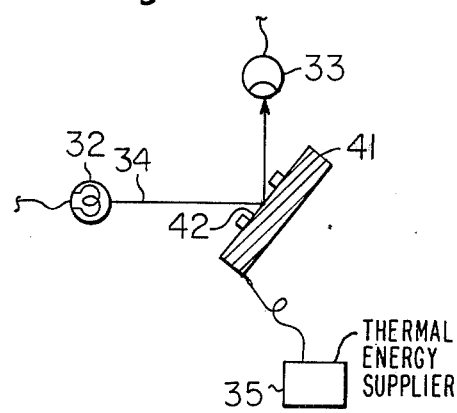
FIGS. 5, 6 and 7 show cross-sectional views of the first, second and third embodiments, respectively, according to the invention.
Figure 5:
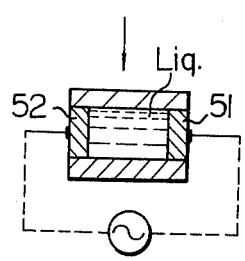
Figure 6:
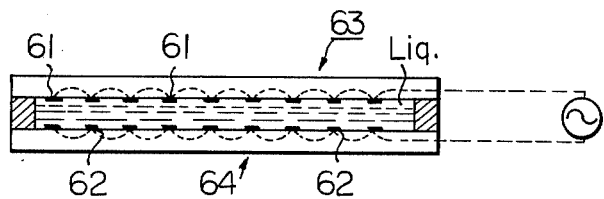
Figure 7:
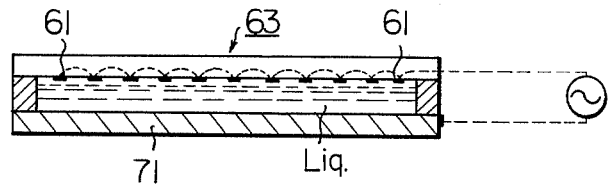

Examples of heating means are illustrated in FIGS. 5, 6 and 7. In the heating means shown in FIG. 5, the direction of the applied current is at right angles to the eyes of an observer, and the electrodes 51 and 52 are so arranged that they do not obstruct the observer's view. This heating means is suitable for a minute, light-disconnecting switch such as a laser switch because the path length of the applied current should not be extended. In FIG. 6, the transparent windows 63 and 64 are provided with small-gauge wire electrodes or transparent electrodes. Therefore, this heating means is suitable for use as a large-sized thermal-optical converter. FIG. 7 shows a reflectable thermal-optical converter which has a lower substrate coated with a simple conductive layer 71.

In each of the above-described cases, the cooling means can be combined with a rapid cooling means such as a fan or with the introduction to a refrigerant to effect the operation for reverting the opaque state back to a transparent state within a short time.

As described above, the present invention provides thermal-optical converters which can completely satisfy the following requirements:

(a) The reversible optical conversions must depend on the presence or absence of heat.
(b) One phase of the two optical conversion phases depending on the presence or absence of heat must be a "transparent" phase.
(c) The structure or composition of the converters must be simple and stable over a long period of time, and such structure can be realized in forms varying from small to extra-large sizes.
(d) The converters must not cause environmental pollution.
(e) The converters must be inexpensively produced.

The thermal-optical converters according to the invention may be suitably utilized, for example, as the following devices:

(1) Temperature indicating device
(2) Screening device
(3) Switching device
(4) Displaying device

What is claimed is:

1. A thermal-optical converter comprising:
   (a) a closed vessel;
   (b) a heat-sensitive material enclosed in said vessel, said material consisting of an aqueous liquid solution of a water-soluble non-ionic polysaccharide derivative dissolved therein, said polysaccharide derivative exhibiting a reversible clouding phenomenon upon raising and lowering of the temperature of the material; and
   (c) a first transparent window formed in at least one part of said closed vessel so that said aqueous solution enclosed therein is visible through said window.

2. A thermal-optical converter as claimed in claim 1, wherein said polysaccharide derivative has a functional group of the formula:

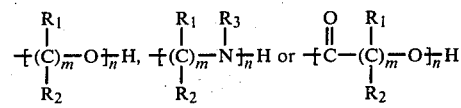

in which m is an integer of 2 or more, n is an integer of 1 or more, and each of $R_1$, $R_2$ and $R_3$ is hydrogen, lower alkyl, hydroxyalkyl, halogenoalkyl, phenyl, phenylalkyl, phenoxyalkyl, amine, aminoalkyl or iminoalkyl.

3. A thermal-optical converter as claimed in claim 2, wherein said functional group is of the formula:

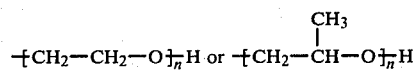

in which n is an intger of 1 or more.

4. A thermal-optical converter as claimed in claim 1, wherein said polysaccharide derivative is hydroxypropyl cellulose.

5. A thermal-optical converter as claimed in claim 1, wherein said aqueous solution contains a non-ionic low molecular compound.

6. A thermal-optical converter as claimed in claim 1, wherein a water-soluble electrolyte is added to said solution.

7. A thermal-optical converter as claimed in claim 6, wherein a neutral salt is said water-soluble electrolyte.

8. A thermal-optical converter as claimed in claim 1, wherein said aqueous solution contains a water-soluble coloring matter.

9. A thermal-optical converter as claimed in claim 1, wherein a desired image pattern is provided in said transparent window.

10. A thermal-optical converter as claimed in claim 1, comprising a substrate located under said aqueous solution and opposite to said transparent window; and a desired image provided on said substrate.

11. A thermal-optical converter according to claim 1, wherein an exothermic substance is provided on said window to determine whether the temperature of the exothermic substance is the same or greater than a reference temperature.

12. A thermal-optical converter according to claim 1 used as a switching device for a light receiving element and located between a luminous element and the light-receiving element located opposite said luminous element, the converter further comprising:
   a second transparent window located in said closed vessel opposite said first window,
   said aqueous solution being interposed between said first and second transparent windows.

13. A thermal-optical converter according to claim 1 wherein said closed vessel is a block.

14. A thermal-optical converter as claimed in claim 13, wherein means for heating and cooling is provided for said block.

15. A thermal-optical converter according to claim 13 wherein said closed vessel comprises a plurality of blocks.

16. A thermal-optical converter as claimed in claim 1, and further comprising means for heating and cooling said heat-sensitive material.

17. A thermal-optical converter as claimed in claim 16, wherein said heating and cooling means are composed of a thermoelectric element.

18. A thermal-optical converter as claimed in claim 16 wherein a plurality of said heating and cooling means is provided to heat and cool said aqueous solution.

19. A thermal-optical converter as claimed in claim 1, further comprising means for heating said heat-sensitive material.

20. A thermal-optical converter as claimed in claim 19, wherein said heating means is not contacted with said aqueous solution.

21. A thermal-optical converter as claimed in claim 19, wherein said heating means is contacted with said aqueous solution.

22. A thermal-optical converter as in claim 21, wherein said heating means is an exothermic, conductive layer.

23. A thermal-optical converter as claimed in claim 21, wherein said heating means is composed of an exothermic, conductive, transparent layer of a metal oxide.

24. A thermal-optical converter as claimed in claim 19, wherein said heating means comprises electrodes for passing an alternating current directly through said aqueous solution.

25. A thermal-optical converter as claimed in claim 24, wherein said electrodes are transparent electrodes for passing a current therethrough.

26. A thermal-optical converter as claimed in claim 1, further comprising means for cooling said heat-sensitive material.

* * * * *